(12) United States Patent
Cao

(10) Patent No.: US 12,489,651 B2
(45) Date of Patent: Dec. 2, 2025

(54) METHOD FOR TASK PROCESSING, NON-TRANSITORY COMPUTER READABLE STORAGE MEDIUM, AND ELECTRONIC DEVICE

(71) Applicant: BOE Technology Group Co., Ltd., Beijing (CN)

(72) Inventor: Tong Cao, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 73 days.

(21) Appl. No.: 18/689,087

(22) PCT Filed: Aug. 23, 2022

(86) PCT No.: PCT/CN2022/114267
§ 371 (c)(1),
(2) Date: Mar. 5, 2024

(87) PCT Pub. No.: WO2023/045676
PCT Pub. Date: Mar. 30, 2023

(65) Prior Publication Data
US 2024/0430115 A1 Dec. 26, 2024

(30) Foreign Application Priority Data
Sep. 23, 2021 (CN) .......................... 202111114793.6

(51) Int. Cl.
  H04L 12/18 (2006.01)
  H04L 12/66 (2006.01)
  H04L 67/00 (2022.01)
(52) U.S. Cl.
  CPC ...... *H04L 12/1818* (2013.01); *H04L 12/1822* (2013.01); *H04L 67/34* (2013.01); *H04L 12/66* (2013.01)

(58) Field of Classification Search
  CPC .. H04L 12/1818; H04L 12/1822; H04L 67/34
  See application file for complete search history.

(56) References Cited

U.S. PATENT DOCUMENTS

| 2011/0026453 | A1  | 2/2011  | Yan |
| 2019/0324797 | A1* | 10/2019 | Miao .......................... G06F 9/52 |

FOREIGN PATENT DOCUMENTS

| CN | 102932348 A | 2/2013 |
| CN | 106304141 A | 1/2017 |

(Continued)

OTHER PUBLICATIONS

International Search Report and Written Opinion mailed on Nov. 29, 2022, in corresponding PCT/CN2022/114267, 16 pages.

(Continued)

*Primary Examiner* — Nazia Naoreen
(74) *Attorney, Agent, or Firm* — XSENSUS LLP

(57) ABSTRACT

A method for task processing, including: receiving a task request sent by a client where a conference all-in-one machine is located, and obtaining a task to be processed comprised in the task request and a display terminal corresponding to the task to be processed by parsing the task request; determining whether the display terminal is present in a preset white list according to a terminal identification of the display terminal, and obtaining heartbeat information reported by the display terminal in response to determining that the display terminal is present in the white list; and generating a target task according to the task to be processed and confirmation information for the heartbeat information, and sending the target task to the display terminal to enable the display terminal to process the target task.

20 Claims, 11 Drawing Sheets

(56) References Cited

FOREIGN PATENT DOCUMENTS

| CN | 109121136 A | 1/2019 |
|---|---|---|
| CN | 109922132 A | 6/2019 |
| CN | 110213250 A | 9/2019 |
| CN | 111314288 A | 6/2020 |
| CN | 111538556 A | 8/2020 |
| CN | 112187899 A | 1/2021 |
| CN | 112532704 A | 3/2021 |
| CN | 113852474 A | 12/2021 |
| KR | 2007-0062632 A | 6/2007 |

OTHER PUBLICATIONS

Zheng Lu, "Application of Internet of Things Technology in the Construction of Smart Campus of Open University", Journal of Guangxi Open University, vol. 31, No. 4, Jul. 20, 2020, pp. 45-48, total 5 pages; with English Abstract.

Office Action issued on Jul. 13, 2023, in corresponding Chinese patent Application No. 202111114793.6, 19 pages.

\* cited by examiner

METHOD FOR TASK PROCESSING, NON-TRANSITORY COMPUTER READABLE STORAGE MEDIUM, AND ELECTRONIC DEVICE

CROSS REFERENCE TO RELATED APPLICATIONS

The present application is based upon International Application No. PCT/CN2022/114267, filed on Aug. 23, 2022, and claims priority to Chinese Patent Application No. 202111114793.6 entitled "Method and gateway for task processing, computer readable storage medium, and electronic device", filed on Sep. 23, 2021, and the entire contents of both of which are incorporated herein by reference.

TECHNICAL FIELD

Embodiments of the present disclosure relate to the field of Internet of Things technology, and in particular, to a method for task processing, a gateway for task processing, a computer readable storage medium, and an electronic device.

BACKGROUND

At the present stage, tasks of a display terminal are generally stored in a cloud server or a local server. Meanwhile, a specific task processing process may be implemented in the following manner.

Firstly, the display terminal establishes a connection with the cloud server or the local server through a gateway; secondly, the gateway sends a query request for processing task to the server when receiving the heartbeat information of the display terminal or at a fixed interval; and finally, the server sends a corresponding task to be processed to the gateway after receiving the query request, and then sends the task to be processed to the display terminal for processing via the gateway.

SUMMARY

According to an aspect of the present disclosure, there is provided a method for task processing, configured on a gateway. The method for task processing includes:
  receiving a task request sent by a client where a conference all-in-one machine is located, and obtaining a task to be processed included in the task request and a display terminal corresponding to the task to be processed by parsing the task request;
  determining whether the display terminal is present in a preset white list according to a terminal identification of the display terminal, and obtaining heartbeat information reported by the display terminal when it is determined that the display terminal is present in the white list; and
  generating a target task according to the task to be processed and confirmation information for the heartbeat information, and sending the target task to the display terminal to enable the display terminal to process the target task.

In some embodiments of the present disclosure, before determining whether the display terminal is present in the preset white list according to the terminal identification of the display terminal, the method for task processing further includes:
  establishing a task folder corresponding to the display terminal according to the terminal identification, and determining a task start time and a task end time of the task folder according to the task to be processed;
  where, determining whether the display terminal is present in the preset white list according to the terminal identification of the display terminal, includes:
  calculating a first time difference and/or a second time difference between a current time node and the task start time and/or the task end time, and determining whether the first time difference and/or the second time difference satisfies a preset condition; and
  determining, if the first time difference and/or the second time difference satisfies the preset condition, whether the display terminal is present in the preset white list according to the terminal identification.

In some embodiments of the present disclosure, determining whether the first time difference and/or the second time satisfies the preset condition includes:
  determining whether the first time difference and/or the second time difference is greater than a first preset threshold, where the first preset threshold is zero.

In some embodiments of the present disclosure, determining whether the display terminal is present in the preset white list according to the terminal identification, further includes:
  calculating a difference between a reporting terminal identification reported by the display terminal and the terminal identification; and
  determining, when it is determined that the difference is greater than the first preset threshold, whether the display terminal is present in the preset white list according to the terminal identification.

In some embodiments of the present disclosure, the task to be processed includes one or more of a conference reservation task, a display terminal registration task, an OTA upgrade task, and a base map update task.

In some embodiments of the present disclosure, when the task to be processed is a conference reservation task, generating the target task according to the task to be processed and the confirmation information for the heartbeat information, and sending the target task to the display terminal to enable the display terminal to process the target task, includes:
  generating a conference time display task according to the confirmation information for the heartbeat information as well as a conference start time and a conference end time included in the conference reservation task; and
  sending the conference time display task to the display terminal to enable the display terminal to display the conference start time and the conference end time.

In some embodiments of the present disclosure, when the task to be processed is a display terminal registration task, before determining whether the display terminal is present in the preset white list according to the terminal identification of the display terminal, the method for task processing further includes:
  adding a terminal identification of the display terminal included in the display terminal registration task to the white list, and receiving a registration request sent by the display terminal;
  where generating the target task according to the task to be processed and the confirmation information for the heartbeat information, and sending the target task to the display terminal to enable the display terminal to process the target task, includes:

calculating a terminal key of the display terminal according to a plaintext general key included in the registration request, and generating a confirmation registration task according to the terminal key and the confirmation information for the heartbeat information; and sending the confirmation registration task to the display terminal to complete registration of the display terminal on a side of the gateway.

In some embodiments of the present disclosure, calculating the terminal key of the display terminal according to the plaintext general key included in the registration request includes:

obtaining the plaintext general key included in the registration request, and determining whether the plaintext general key is a legal key; and taking, when it is determined that the plaintext general key is a legal key, the plaintext general key as an encryption factor, and performing calculation on the plaintext general key by using a preset encryption algorithm to obtain the terminal key of the display terminal.

In some embodiments of the present disclosure, when the task to be processed is an OTA upgrade task, generating the target task according to the task to be processed and the confirmation information for the heartbeat information, and sending the target task to the display terminal to enable the display terminal to process the target task, includes:

obtaining a first download address of an OTA upgrade packet included in the OTA upgrade task by parsing the OTA upgrade task, and downloading the OTA upgrade packet according to the first download address;

performing verification on completeness and security of the OTA upgrade packet, and decoding the OTA upgrade packet when it is determined that the OTA upgrade packet is complete and secure;

obtaining a compressed data packet by compressing the decoded OTA upgrade packet, and generating an OTA upgrade task packet according to the compressed data packet and the confirmation information for the heartbeat information; and sending the OTA upgrade task packet to the display terminal to enable the display terminal to update a program included in the display terminal according to the compressed data packet in the OTA upgrade task packet.

In some embodiments of the present disclosure, performing verification on completeness and security of the OTA upgrade packet includes:

performing verification on completeness of the OTA upgrade packet based on a preset information digest algorithm;

performing decryption on the OTA upgrade packet by using a first public key when it is determined that the OTA upgrade packet is a complete data packet; and determining that the OTA upgrade packet is a secure data packet when it is determined that a decryption result is successful decryption.

In some embodiments of the present disclosure, when the task to be processed is a base map update task, generating the target task according to the task to be processed and the confirmation information for the heartbeat information, and sending the target task to the display terminal to enable the display terminal to process the target task, includes:

obtaining a second download address of a base map to be updated by parsing the base map update task, and downloading the base map to be updated according to the second download address;

generating a target base map update task according to the base map to be updated as well as the task to be processed and the confirmation information for the heartbeat information; and sending the target base map update task to the display terminal to enable the display terminal to update a base map in the display terminal according to the base map to be updated included in the target base map update task.

In some embodiments of the present disclosure, the method for task processing further includes:

receiving task feedback information sent by the display terminal after completion of a conference reservation task and/or a display terminal registration task and/or an OTA upgrade task and/or a base map update task; and generating a task feedback linked list according to the task feedback information as well as a first task identification of the conference reservation task and/or a second task identification of the display terminal registration task and/or a third task identification of the OTA upgrade task and/or a fourth task identification of the base map update task.

In some embodiments of the present disclosure, receiving the task request sent by the client where the conference all-in-one machine is located includes:

establishing an Http connection between the client where the conference all-in-one machine is located and the gateway, and receiving the task request sent by the client where the conference all-in-one machine is located based on the Http connection;

where the task request is generated through performing a selection operation on task information displayed on a display interface of the client by a user.

According to an aspect of the present disclosure, there is provided a gateway for task processing, including:

a task parsing module, configured to receiving a task request sent by a client where a conference all-in-one machine is located, and obtain a task to be processed included in the task request and a display terminal corresponding to the task to be processed by parsing the task request;

a display terminal determination module, configured to determine whether the display terminal is present in a preset white list according to a terminal identification of the display terminal, and obtain heartbeat information reported by the display terminal when it is determined that the display terminal is present in the white list; and a task processing module, configured to generate a target task according to the task to be processed and the confirmation information for the heartbeat information, and send the target task to the display terminal to enable the display terminal to process the target task.

According to an aspect of the present disclosure, there is provided a computer-readable storage medium, with a computer program stored thereon; when the computer program is executed by a processor, any of the method for task processing described above is implemented. According to an aspect of the present disclosure, there is provided an electronic device, including:

a processor; and a memory, configured to store an executable instruction of the processor;

where the processor is configured to perform any of the method for task processing described above, by executing the executable instruction.

It should be understood that the above general description and the following detailed description are merely exemplary and explanatory, and cannot limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skill in the art, other drawings can also be obtained from these drawings without creative efforts. In the drawings.

DETAILED DESCRIPTION

Figure 1:
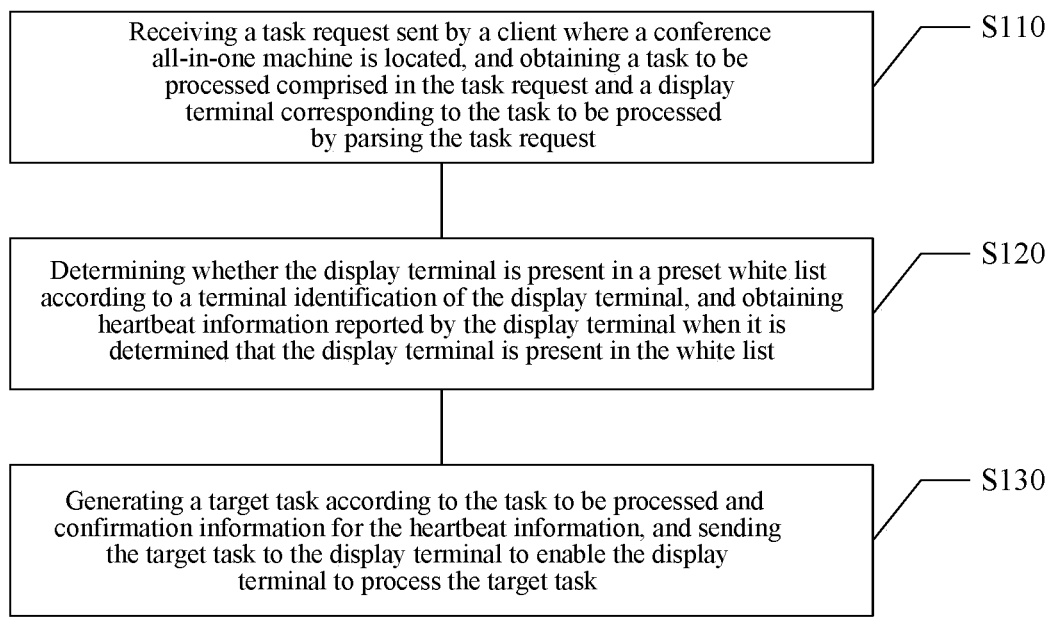
FIG. 1 schematically illustrates a flowchart of a method for task processing according to some embodiments of the present disclosure.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The described features, structures, or characteristics may be combined in any suitable manner in one or more embodiments.

In addition, the drawings are merely schematic illustrations of the present disclosure, and are not necessarily drawn to scale. Same reference numerals in the drawings denote the same or similar parts, and thus repeated descriptions of them will be omitted. Some block diagrams shown in the drawings are functional entities, and do not necessarily correspond to physical or logically independent entities. These functional entities may be implemented in the form of software, or these functional entities may be implemented in one or more hardware modules or integrated circuits, or these functional entities may be implemented in different networks and/or processor apparatuses and/or microcontroller apparatuses.

On the basis of the Internet, the Internet of Things is to construct a network information system covering all people and objects in the world by using technologies such as a radio frequency identification technology, a sensor and a wireless sensor network, so that various activities of the human are operated on the smart Internet of Things infrastructure.

Among them, the "object" in the Internet of Things needs to satisfy the following conditions: having a corresponding information receiver, having a data transmission path, having a certain storage function, having a CPU, having an operating system, having a special application program, having a data transmitter, following a communication protocol for the Internet of Things, and having a unique number that can be identified in the world network. In this way, the "object" can be integrated into the "Internet of Things", which can have "perceived nerves" and "smart brain".

In the example embodiment, there is firstly provided a method for task processing, and the method may be configured on a gateway. Those skilled in the art may also operate the method of the present disclosure on other platforms according to requirements, which is not specifically limited in the example embodiment. Referring to FIG. 1, the method for task processing may include the following steps.

In step S110, a task request sent by a client where a conference all-in-one machine is located is received, and the task request is parsed to obtain a task to be processed included in the task request and a display terminal corresponding to the task to be processed.

In step S120, it is determined whether the display terminal is present in a preset white list according to a terminal identification of the display terminal, and heartbeat information reported by the display terminal is obtained when it is determined that the display terminal is present in the white list.

In step S130, a target task is generated according to the task to be processed and confirmation information for the heartbeat information, and the target task is sent to the display terminal to enable the display terminal to process the target task.

In the above method for task processing, on one hand, since the method for task processing is configured on the gateway and can directly receive the task request sent by the client where the conference all-in-one machine is located, the task request can be then processed without obtaining the corresponding task from the cloud server or the local server, solving the problems in the related art that the task processing efficiency and the task processing timeliness are relatively lower due to the fact that the gateway cannot obtain the task to be processed from the server in time, and improving the efficiency of task processing and the timeliness of task processing; on the other hand, it is determined whether the display terminal is present in a preset white list according to the terminal identification of the display terminal, and heartbeat information reported by the display terminal is obtained when it is determined that the display terminal is present in the white list; finally, the target task is generated according to the task to be processed and the confirmation information for the heartbeat information, and the target task is sent to the display terminal to enable the display terminal to process the target task, ensuring the legality of the display terminal, and further improving the security of the system.

In the following, the steps included in the method for task processing according to the example embodiment of the present disclosure will be explained and explained in detail with reference to the accompanying drawings.

Firstly, the object of the invention and application scene of example embodiments of the present disclosure are explained and illustrated. Specifically, according to example embodiments of the present disclosure, there is provided a gateway software implementation method for a conference reservation system, to display reservation conference information on a wireless terminal doorplate. Specifically, the conference all-in-one machine and the gateway are directly connected through a static IP (Internet Protocol) Ethernet, and perform interaction through an HTTP (HyperText Transfer Protocol). In order to ensure that connection resources are saved, clients (application programs, APPs) in the gateway and the conference all-in-one machine are both httpServers, and are httpClients at the same time. The gateway and the terminal use Lora wireless communication.

Furthermore, since the reasonable and efficient utilization, occupation, and reservation information reminder of the conference room is always a long-term pain point, and along with the intelligent improvement of the electronic equipment, the conference all-in-one machine or the electronic whiteboard increasingly becomes the standard configuration for the conference room, an intelligent conference reservation display system can be formed by combining the gateway and the conference all-in-one machine and further combining with the wireless terminal doorplate. Therefore, according to some embodiments of the present disclosure, there is provided a method for task processing based on this scene. Through interaction between the gateway and the conference all-in-one machine as well as the display terminal, the conference can be reserved through the conference all-in-one machine, and finally the conference reservation information can be sent to the wireless terminal doorplate and displayed on the terminal doorplate.

Figure 2:
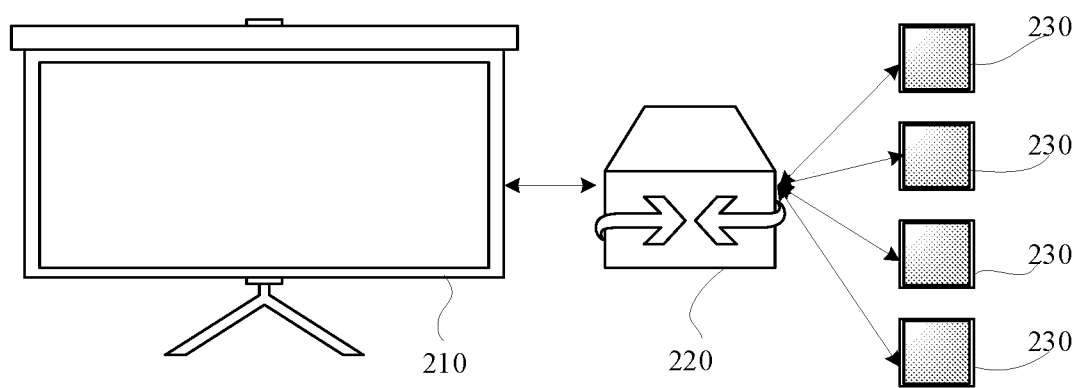
FIG. 2 schematically illustrates a block diagram of a system for task processing according to some embodiments of the present disclosure.

Secondly, the system for task processing involved in the example embodiments of the present disclosure is explained and described. Specifically, referring to FIG. 2, the system for task processing may include a conference all-in-one machine 210, a gateway 220 and a display terminal 230. Among them, the conference all-in-one machine is connected with the gateway through the Ethernet, the gateway is connected with the display terminal through Lora, the conference all-in-one machine is provided with a client, and a user can perform conference reservation through the client provided in the conference all-in-one machine. In addition, in the system for task processing, one gateway may be bound with one or more conference all-in-one machines, or may be bound with one or more display terminals; and, the display terminal is a wireless terminal board; the display terminal may also be another display terminal for displaying, which is not specifically limited in this example.

Figure 3:
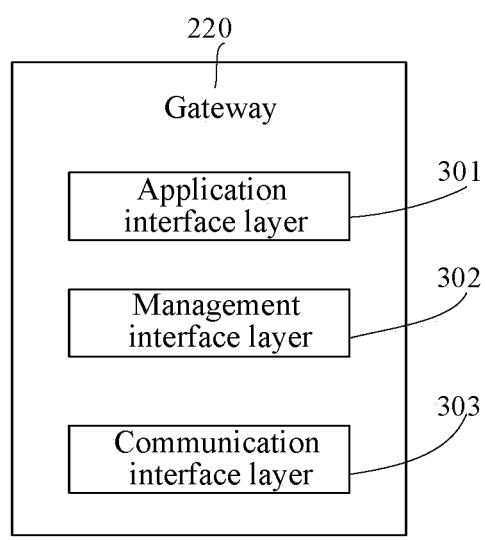
FIG. 3 schematically illustrates a structure example diagram of a gateway according to some embodiments of the present disclosure.

At the same time, as shown in FIG. 3, the gateway 220 may include an application interface layer 301, a management interface layer 302, and a communication interface layer 303. Among them, the communication interface layer is used to be connected to the conference all-in-one machine through the Ethernet, that is, the communication interface layer is used mainly for interfaces such as bottom-layer reading, writing, opening and closing of the network port TCP communication and the serial port communication. The management interface layer is used to implement the method for task processing recited in the present disclosure, that is, the management interface layer implements terminal device management, task management, white list management, log management, message queue management, and configuration file management; among them, terminal device management is used to manage various state information of the device; task management is used to manage the task linked list, the successful task list, and the failure task list; white list management is used to manage the legal device identification list of the system, and only the device identification in the white list can be added in the system; log management is used to manage system logs, log segmentation or the like; message queue management is used to manage upstream and downstream data messages; configuration file management is used to manage system startup configuration information and file record information during system running. The application interface layer is used to receive the task request sent by the conference all-in-one machine and/or send the data acquisition request to the conference all-in-one machine, that is, the application interface layer implements that the interface of the httpServer is mainly used for response to a method such as GET and POST of the conference all-in-one machine, and the interface of the httpClient is mainly used to be connected to the conference all-in-one machine and then download data files such as pictures and characters from the conference all-in-one machine.

Furthermore, the method for task processing according to some embodiments of the present disclosure includes following steps.

In step S110, a task request sent by a client where a conference all-in-one machine is located is received, and the task request is parsed to obtain a task to be processed included in the task request and a display terminal corresponding to the task to be processed.

In the example embodiment, firstly, receiving the task request sent by the client where the conference all-in-one machine is located, may specifically include: establishing an Http connection between the client where the conference all-in-one machine is located and the gateway, and receiving the task request sent by the client where the conference all-in-one machine is located based on the Http connection; where the task request is generated by a user performing a selection operation on task information displayed on a display interface of the client. Specifically, when the user needs to perform conference reservation, display terminal registration, program upgrade, or base map update, the user may select a corresponding task through a client included in the conference all-in-one machine, and the client may math a corresponding display terminal according to the task selected by the user, then generate a corresponding task request, and send the task request to the gateway.

Furthermore, after receiving the task request, the gateway may parse the task request to obtain a task to be processed included in the task request and a display terminal corresponding to the task to be processed, where the task to be processed includes a conference reservation task, a display terminal registration task, an OTA upgrade task, a base map update task, or the like. It should be noted here that the task to be processed may also be another task, such as a display terminal state query task or a display terminal deletion task, etc., which is not specifically limited in this example.

In step S120, it is determined whether the display terminal is present in a preset white list according to a terminal identification of the display terminal, and heartbeat information reported by the display terminal is obtained when it is determined that the display terminal is present in the white list.

In some embodiments, in order to avoid the problem of task processing failure caused by sudden disconnection of the network, a folder corresponding to the task to be processed can be created in the gateway, so that after the network is connected, the task to be processed in the folder can be processed to avoid the problem of missing processing or repeated processing of the task. Specifically, the method for task processing may further include: establishing a task folder corresponding to the display terminal according to the terminal identification, and determining a task start time and a task end time of the task folder according to the task to be processed.

Figure 4:
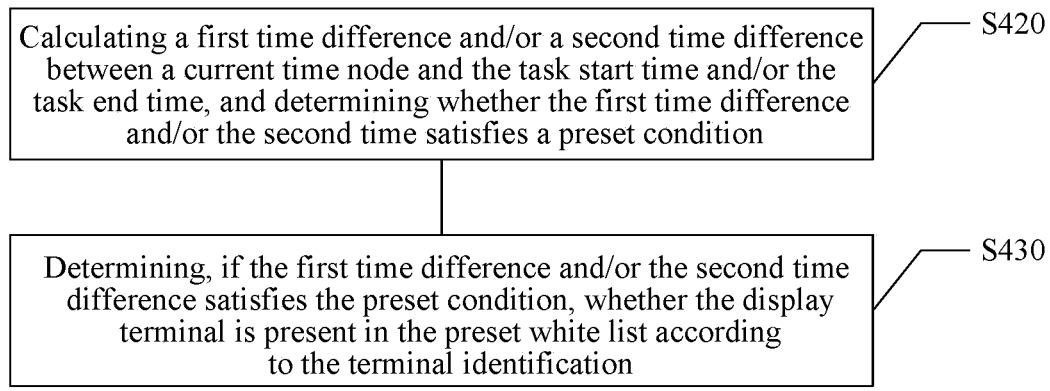
FIG. 4 schematically illustrates a flowchart of a method for determining whether the display terminal is present in a preset white list according to a terminal identification of the display terminal, according to some embodiments of the present disclosure.

Furthermore, after the establishment of the task folder is completed, a specific task processing process may be performed. Among them, referring to FIG. 4, determining whether the display terminal is present in the preset white list according to the terminal identification of the display terminal, may include the following steps.

In step S410, a first time difference and/or a second time difference between a current time node and the task start time and/or the task end time is calculated, and it is determined whether the first time difference and/or the second time satisfies a preset condition.

Among them, determining whether the first time difference and/or the second time satisfies the preset condition may include: determining whether the first time difference and/or the second time difference is greater than a first preset threshold, where the first preset threshold is zero.

In step S420, if the first time difference and/or the second time difference satisfies the preset condition, it is determined whether the display terminal is present in the preset white list according to the terminal identification.

Among them, determining whether the display terminal is present in the preset white list according to the terminal identification, may further include: firstly, calculating a difference between a reporting terminal identification reported by the display terminal and the terminal identification; and then, when it is determined that the difference is greater than the first preset threshold, determining whether the display terminal is present in the preset white list according to the terminal identification.

In the following, the steps S410 to S420 will be explained and described. Specifically, firstly, a task folder corresponding to the display terminal is created in the gateway by using the terminal identification {device_id}, and then the task start time and the task end time of the task folder are determined according to the task to be processed. For example, when the task to be processed is a conference reservation task, the task start time and the task end time can be determined according to the conference start time and the conference end time required by the conference reservation task; and when the task to be processed is a base map update task, the task start time and the task end time can be determined according to the specific update time, etc.

Furthermore, after the creation of the task folder is completed, a task.ini file can be created and maintained under the task folder. Among them, the content of the task.ini file may be as follows:

```
[task]
    task_id = "2"// task sequence number
    data_id = "1"// data sequence number
```

-continued

```
start_time = 2021-05-21 11:11:00// task execution start time
end_time = 2021-05-21 11:11:00// task execution end time
device_id = "00A20001341A"// ID of the terminal needing to
execute the task
task_status = 0// task execution state
```

Furthermore, when an application program in the conference all-in-one machine establishes a task to be processed executed by a plurality of display terminals and there is a plurality of display terminals working under the same gateway, a task folder named by the corresponding terminal identification {device_id} is stored in a manner of creating a task folder. At that time, the task folder is not created in advance, but the task folder is created according to the field of device_id when creating the task through the POST data.

Moreover, after the gateway restores the network connection, the following policy may be executed: on one hand, the first time difference between the current time node and the end_time (the task end time) is compared, and if the first time difference is greater than zero, it is considered that the task is out of time, that is, it is considered that the task is not present and does not need to be executed; on another hand, the second time difference between the current time node and the start_time (the task start time) is compared, and if the second time difference is greater than zero, it is considered that the task to be processed does not start, and the task is not present and does not need to be executed; on still another hand, the difference between the reporting terminal identification reported by the terminal and the terminal identification is compared, and if the difference is a negative number or 0, the task to be processed is not present, otherwise, the task to be processed is present.

Furthermore, after the creation of the task folder is completed, it can be determined whether the display terminal is present in the preset white list according to the terminal identification of the display terminal; and, the heartbeat information reported by the display terminal can be obtained when it is determined that the display terminal is present in the white list. It should be noted here that after the heartbeat information is obtained, it can be determined whether the display terminal is online according to a third time difference between the reporting time of the heartbeat information and the current time; if the third time difference is too long, it can be waited until the display terminal reports the heartbeat information next time, and then the corresponding target task can be sent; and if the third time difference is within a certain range, the target task can be directly sent. By means of the method, it can be ensured that the task can be accurately sent to the corresponding display terminal, thus improving the success rate of task issuing.

In step S130, the target task is generated according to the task to be processed and the confirmation information for the heartbeat information, and the target task is sent to the display terminal to enable the display terminal to process the target task.

In the example embodiment, since the task to be processed may include various situations, the specific task processing process is explained and illustrated below through FIG. 5 to FIG. 8.

Figure 5:
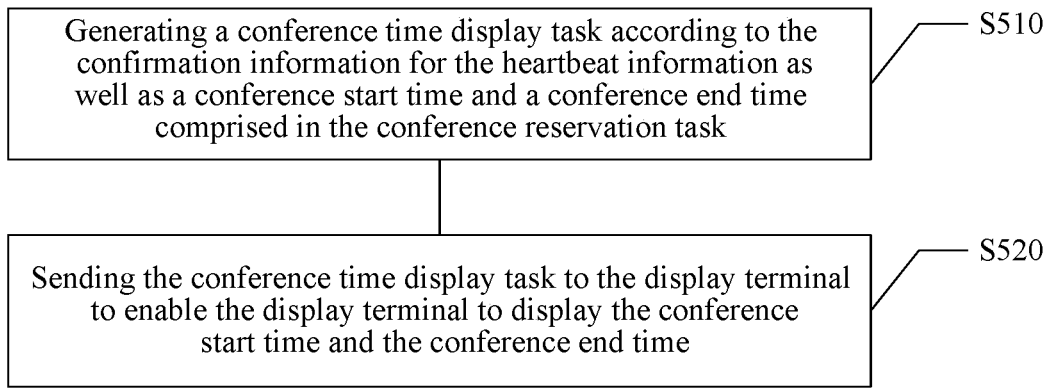
FIG. 5 schematically illustrates a flowchart of a method for processing a conference time display task according to some embodiments of the present disclosure.

Firstly, referring to FIG. 5, when the task to be processed is a conference reservation task, generating the target task according to the task to be processed and the confirmation information for the heartbeat information, and sending the target task to the display terminal to enable the display terminal to process the target task, may include the following steps.

In step S510, a conference time display task is generated according to the confirmation information for the heartbeat information as well as a conference start time and a conference end time included in the conference reservation task.

Step S520, the conference time display task is sent to the display terminal to enable the display terminal to display the conference start time and the conference end time.

In the following, the step S510 and the step S520 will be explained and illustrated. Specifically, firstly, confirmation information is generated according to heartbeat information reported by the display terminal, then a conference time display task is generated according to the confirmation information as well as the conference start time and the conference end time, and then the conference time display task is sent to the display terminal; and after receiving the conference time display task, the display terminal parses the conference time display task to obtain the conference start time and the conference end time, and displays the conference start time and the conference end time in a display interface to complete the conference reservation task. By means of the method, the user can clearly determine the occupation condition of each conference room according to the conference start time and the conference end time displayed on the display terminal, thus improving user experience under the condition that the utilization rate of the conference room is improved.

Figure 6:
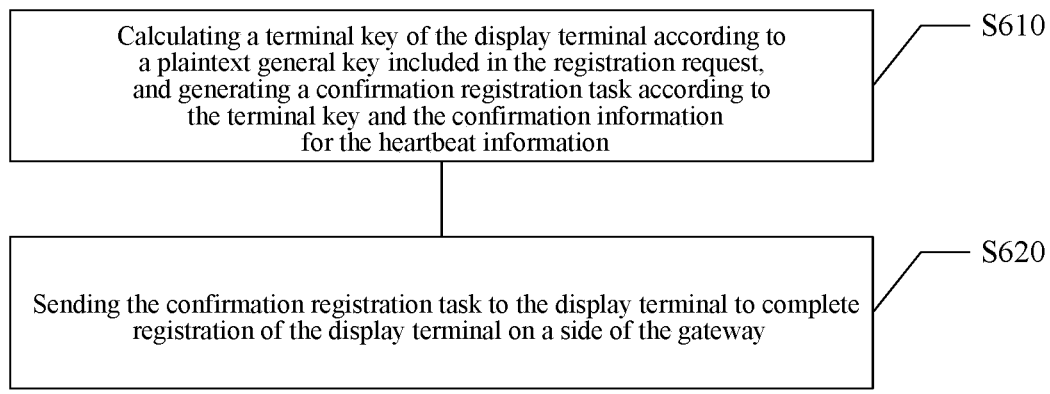
FIG. 6 schematically illustrates a flowchart of a method for processing a confirmation registration task according to some embodiments of the present disclosure.

Secondly, referring to FIG. 6, when the task to be processed is a display terminal registration task, generating the target task according to the task to be processed and the confirmation information for the heartbeat information, and sending the target task to the display terminal to enable the display terminal to process the target task, may include the following steps.

In step S610, a terminal key of the display terminal is calculated according to a plaintext general key included in the registration request, and a confirmation registration task is generated according to the terminal key and the confirmation information for the heartbeat information.

Specifically, calculating the terminal key of the display terminal according to the plaintext general key included in the registration request may include: firstly, obtaining the plaintext general key included in the registration request, and determining whether the plaintext general key is a legal key; secondly, when it is determined that the plaintext general key is a legal key, taking the plaintext general key as an encryption factor, and performing calculation on the plaintext general key by using a preset encryption algorithm to obtain the terminal key of the display terminal.

In step S620, the confirmation registration task is sent to the display terminal to complete registration of the display terminal on a side of the gateway.

In the following, the step S610 and the step S20 are explained and illustrated. Firstly, in order to complete the display terminal registration task, it is needed that the terminal identification in the display terminal is obtained from the client in the conference all-in-one machine, and then the terminal identification is added to the white list. Specifically, the method for task processing further includes: adding the terminal identification of the display terminal included in the display terminal registration task to the white list, and receiving a registration request sent by the display terminal. That is, after the gateway reports the registration task from the conference all-in-one machine, the terminal identification included in the registration task may be added to the white list, and then the device registration process may be then started.

Secondly, after receiving the registration request sent by the display terminal, the gateway may calculate the terminal key of the display terminal according to the plaintext general key included in the registration request. Among them, in the process of calculating the terminal key, the display terminal firstly sends a plaintext general key, and after the gateway verifies that the key is legal, the gateway replies to the terminal that registration is successful and brings with a new terminal key; and in the process of calculating the terminal key, the terminal key may be calculated based on a preset symmetric encryption algorithm (such as DES) or a preset asymmetric encryption algorithm (such as RSA or DSA), which is not specifically limited in this example.

It should be noted here that one-to-one binding between the gateway and the display terminal can be implemented by using key verification for twice, so that it can be ensured that the display terminal cannot be bound to other gateways, and the gateway only filters and receives information of the currently bound display terminal. Meanwhile, the display terminal carries a new terminal key and reports the heartbeat information of the display terminal periodically through heartbeat; the gateway replies the confirmation information for the heartbeat information of the display terminal; if the conference all-in-one machine issues a task to the gateway, after next heartbeat, the gateway replies that the display terminal has a task; the display terminal prepares to receive the task, the gateway locally maintains the task information, and reports the final task result. By means of the method, the burden of the gateway can be reduced while the completion efficiency of the task is improved, and the success rate of task completion is improved.

Figure 7:
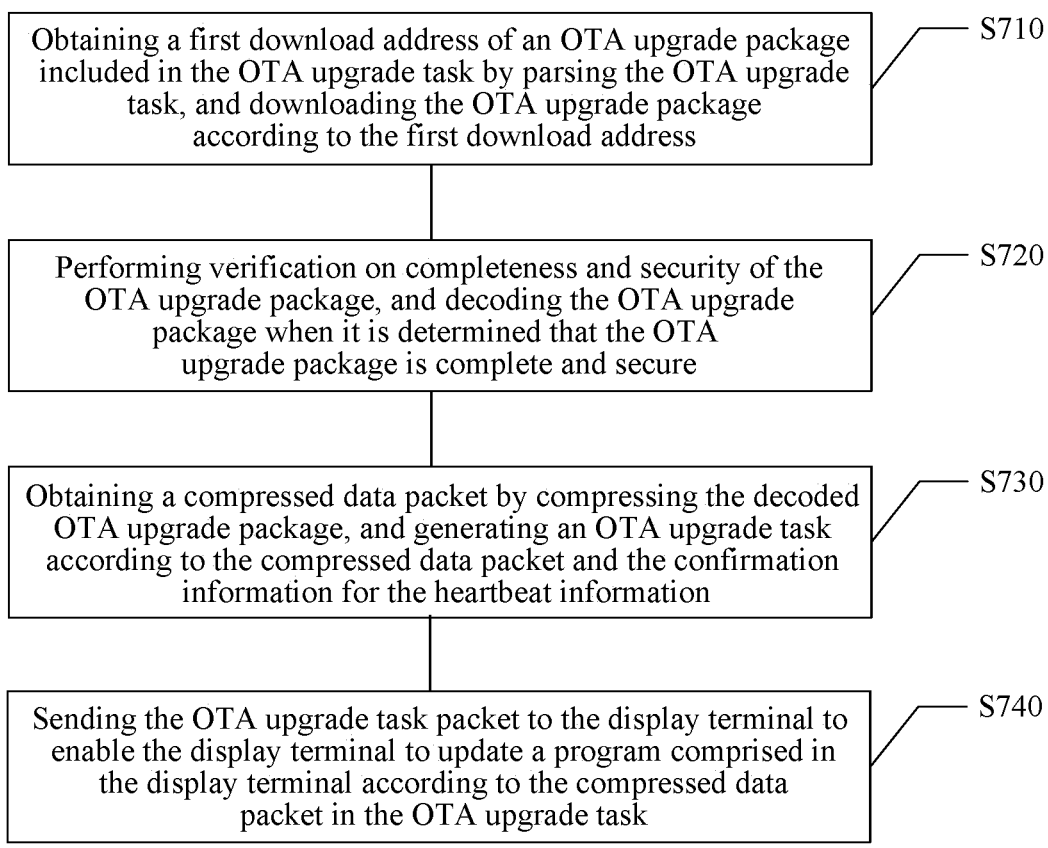
FIG. 7 schematically illustrates a flowchart of a method for processing an OTA upgrade task according to some embodiments of the present disclosure.

Furthermore, referring to FIG. 7, when the task to be processed is an OTA upgrade task, generating the target task according to the task to be processed and the confirmation information for the heartbeat information, and sending the target task to the display terminal to enable the display terminal to process the target task, may include the following steps.

In step S710, a first download address of an OTA upgrade packet included in the OTA upgrade task is obtained by parsing the OTA upgrade task, and the OTA upgrade packet is downloaded according to the first download address.

In step S720, verification is performed on completeness and security of the OTA upgrade packet, and the OTA upgrade packet is decoded when it is determined that the OTA upgrade packet is complete and secure.

Specifically, performing verification on completeness and security of the OTA upgrade packet may include: firstly, performing verification on completeness of the OTA upgrade packet based on a preset information digest algorithm; secondly, when it is determined that the OTA upgrade packet is a complete data packet, performing decryption on the OTA upgrade packet by using a first public key; and finally, when it is determined that a decryption result is successful decryption, determining that the OTA upgrade packet is a secure data packet.

In step S730, a compressed data packet is obtained by compressing the decoded OTA upgrade packet, and the OTA upgrade task packet is generated according to the compressed data packet and confirmation information for the heartbeat information.

In step S740, the OTA upgrade task packet is sent to the display terminal to enable the display terminal to update a program included in the display terminal according to the compressed data packet in the OTA upgrade task packet.

In the following, the steps S710 to S740 are explained and illustrated. Specifically, when the gateway receives an over-the-air technology (OTA) upgrade task pushed by the client included in the conference all-in-one machine, the task information may carry information such as the first download address and size of the OTA upgrade packet of the task. In a specific execution process, the gateway is connected to a client in the conference all-in-one machine as a httpClient, then downloads the OTA upgrade packet from the client, and then performs of three steps of verification according to the received OTA task information. Firstly, data completeness verification, such as MD5 algorithm verification, is performed, where the data completeness verification is to ensure that the downloaded data format and size are correct. Secondly, data security verification is performed for the security of network transmission; specifically, since the OTA data packet is encrypted by the private key, decryption verification is needed; if decryption succeeds, it is proved that the OTA data packet is secure, otherwise, the OTA data packet is not secure. Finally, in order that the OTA upgrade packet is better transmitted in the network, base64 encoding and decoding are needed, and the decoded OTA upgrade packet is compressed to obtain a compressed data packet; and finally, the compressed data packet is sent to the display terminal, so that the display terminal updates the program according to the compressed data packet.

Among them, the OTA task information may be specifically shown as follows:

```
{
    "cmd":"OTA",
    "task_id":2,
    "data_id":2,
    "md5":"8338bed143de790b7dace20fa781e40a",
    "start_time":"2020-09-21 10:04:30",
    "end_time":"2020-09-21 10:10:00",
    "device_id":"00A20001341A",
    "image_data":"task base64 transcoding data"
}
```

It should be noted here that through performing update by using the described method, the security of the system and the success rate of program update can be ensured on the basis of ensuring the update efficiency of the program.

Figure 8:
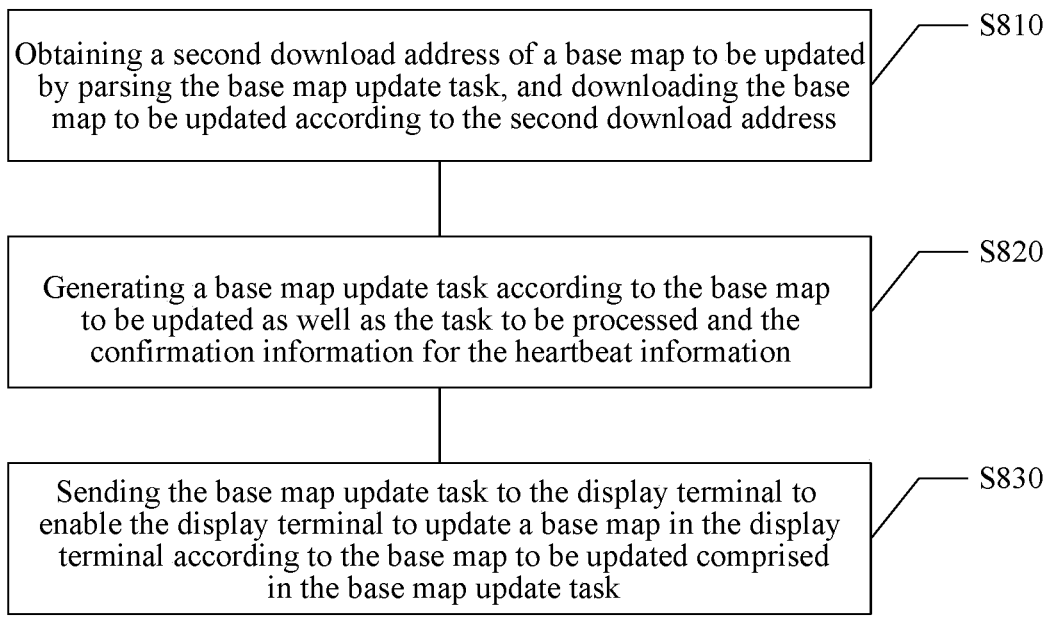
FIG. 8 schematically illustrates a flowchart of a method for processing a base map update task according to some embodiments of the present disclosure.

Finally, referring to FIG. 8, when the task to be processed is a base map update task, generating the target task according to the task to be processed and the confirmation inform for the heartbeat information, and sending the target task to the display terminal to enable the display terminal to process the target task, may include the following steps.

In step S810, a second download address of the base map to be updated is obtained by parsing the base map update task, and the base map to be updated is downloaded according to the second download address.

In step S820, the target base map update task is generated according to the base map to be updated as well as the task to be processed and the confirmation information for the heartbeat information.

In step S830, the target base map update task is sent to the display terminal to enable the display terminal to update a base map in the display terminal according to the base map to be updated included in the target base map update task.

In the method shown in FIG. 8, the base map update task of the display terminal bound under the gateway can be directly allocated through the gateway, so that update of the base map to be updated in the display terminal is realized, and the base map update efficiency can be improved under the condition that the gateway burden is reduced.

It should be further noted here that in the specific task processing process shown in FIG. 5 to FIG. 8, due to the fact that the conference all-in-one machine and the gateway are directly connected through the static IP Ethernet, and perform interaction through the Http protocol, therefore, for the general extension design of the gateway, the gateway may not only perform offline data transmission with the client included in the conference all-in-one machine, but also may have a framework design for online transmission with the cloud server. In order to save connection resources, the clients included in the gateway and the conference all-in-one machine are both httpServers, and are httpClients at the same time, which are disconnected after being used up, so that the server connection resources are saved.

Furthermore, after the task processing is completed, the method for task processing may further include: firstly, receiving task feedback information sent by the display terminal after completion of a conference reservation task and/or a display terminal registration task and/or an OTA upgrade task and/or a base map update task; secondly, generating a task feedback linked list according to the task feedback information as well as a first task identification of the conference reservation task and/or a second task identification of the display terminal registration task and/or a third task identification of the OTA upgrade task and/or a fourth task identification of the base map update task. Among them, the task feedback linked list may include a task success linked list and a task failure linked list. By setting the linked list, the processing condition of each task can be accurately checked, and after task processing failure is checked, corresponding adjustment may be performed in time according to the failure reason.

Figure 9:
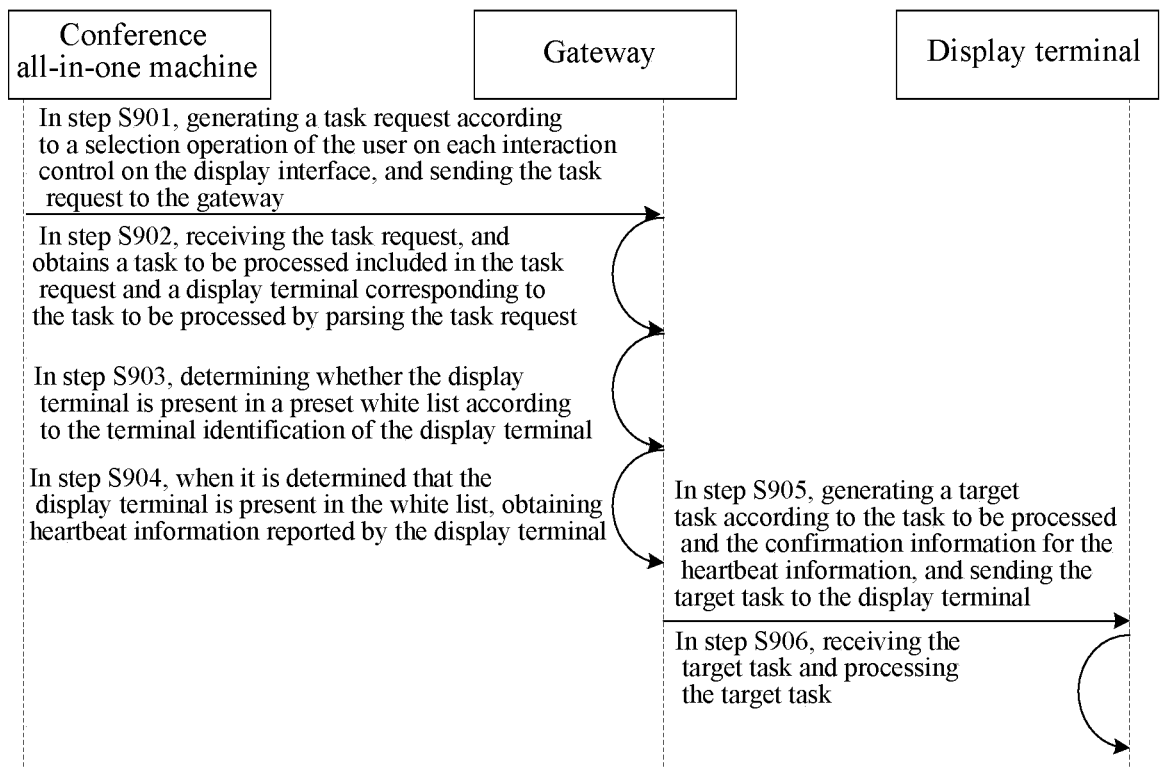
FIG. 9 schematically illustrates a flowchart of another method for task processing according to some embodiments of the present disclosure.

In the following, the method for task processing according to some embodiments of the present disclosure is further explained and illustrated in conjunction with FIG. 9. Referring to FIG. 9, the method for task processing may include the following steps.

In step S901, the conference all-in-one machine generates a task request according to a selection operation of the user on each interaction control on the display interface, and sends the task request to the gateway.

In step S902, the gateway receives the task request, and obtains a task to be processed included in the task request and a display terminal corresponding to the task to be processed by parsing the task request.

In step S903, the gateway determines whether the display terminal is present in a preset white list according to the terminal identification of the display terminal.

In step S904, when it is determined that the display terminal is present in the white list, the gateway obtains heartbeat information reported by the display terminal.

In step S905, the gateway generates a target task according to the task to be processed and the confirmation information for the heartbeat information, and sends the target task to the display terminal.

In step S906, the display terminal receives the target task and processes the target task.

According to the method for task processing provided by some embodiments of the present disclosure, since the generation and allocation of the task are all implemented through the gateway, it can be ensured that even if the gateway and the server are disconnected, the gateway can still manage the task of the display terminal, thus improving the efficiency of task processing and the timeliness of task processing.

Figure 10:
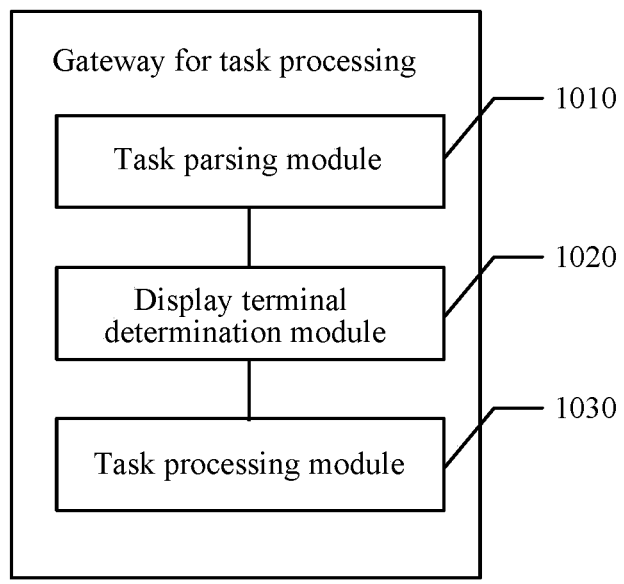
FIG. 10 schematically illustrates a block diagram of a gateway for task processing according to some embodiments of the present disclosure.

According to example embodiments of the present disclosure, there is further provided a gateway for task processing. Referring to FIG. 10, the gateway for task processing may include a task parsing module 1010, a display terminal determination module 1020, and a task processing module 1030.

The task parsing module 1010 may be configured to receive a task request sent by a client where a conference all-in-one machine is located, and obtain a task to be processed included in the task request and a display terminal corresponding to the task to be processed by parsing the task request.

The display terminal determination module 1020 may be configured to determine whether the display terminal is present in a preset white list according to a terminal identification of the display terminal, and obtain heartbeat information reported by the display terminal when it is determined that the display terminal is present in the white list.

The task processing module 1030 may be configured to generate a target task according to the task to be processed and the confirmation information for the heartbeat information, and send the target task to the display terminal to enable the display terminal to process the target task.

In some embodiments of the present disclosure, the gateway for task processing further includes a task folder establishing module.

The task folder establishing module may be configured to establish a task folder corresponding to the display terminal according to the terminal identification, and determine a task start time and a task end time of the task folder according to the task to be processed.

Among them, determining whether the display terminal is present in the preset white list according to the terminal identification of the display terminal, includes the following:
  calculating a first time difference and/or a second time difference between a current time node and the task start time and/or the task end time, and determining whether the first time difference and/or the second time difference satisfies a preset condition; and
  if the first time difference and/or the second time difference satisfies the preset condition, determining whether the display terminal is present in the preset white list according to the terminal identification.

In some embodiments of the present disclosure, determining whether the first time difference and/or the second time satisfies the preset condition, includes the following:
  determining whether the first time difference and/or the second time difference is greater than a first preset threshold, where the first preset threshold is zero.

In some embodiments of the present disclosure, determining whether the display terminal is present in the preset white list according to the terminal identification, further includes the following:
  calculating a difference between a reporting terminal identification reported by the display terminal and the terminal identification; and
  when it is determined that the difference is greater than the first preset threshold, determining whether the display terminal is present in the preset white list according to the terminal identification.

In some embodiments of the present disclosure, the task to be processed includes one or more of a conference reservation task, a display terminal registration task, an OTA upgrade task, and a base map update task.

In some embodiments of the present disclosure, when the task to be processed is a conference reservation task, generating the target task according to the task to be processed and the confirmation information for the heartbeat information, and sending the target task to the display terminal to enable the display terminal to process the target task, includes the following:
  generating a conference time display task according to the confirmation information for the heartbeat information as well as a conference start time and a conference end time included in the conference reservation task; and
  sending the conference time display task to the display terminal to enable the display terminal to display the conference start time and the conference end time.

In some embodiments of the present disclosure, when the task to be processed is a display terminal registration task, the gateway for task processing further includes a terminal identification adding module.

The terminal identification adding module may be configured to add a terminal identification of the display terminal included in the display terminal registration task to the white list, and receive a registration request sent by the display terminal.

Among them, generating the target task according to the task to be processed and the confirmation information for the heartbeat information, and sending the target task to the display terminal to enable the display terminal to process the target task, includes the following:
  calculating a terminal key of the display terminal according to a plaintext general key included in the registration request, and generating a confirmation registration task according to the terminal key and the confirmation information for the heartbeat information; and
  sending the confirmation registration task to the display terminal to complete registration of the display terminal on a side of the gateway.

In some embodiments of the present disclosure, calculating the terminal key of the display terminal according to the plaintext general key included in the registration request, includes the following:
  obtaining the plaintext general key included in the registration request, and determining whether the plaintext general key is a legal key.

Among them, when it is determined that the plaintext general key is a legal key, the plaintext general key is taken as an encryption factor, and calculation is performed on the plaintext general key by using a preset encryption algorithm to obtain the terminal key of the display terminal.

In some embodiments of the present disclosure, when the task to be processed is an OTA upgrade task, generating the target task according to the task to be processed and the confirmation information for the heartbeat information, and sending the target task to the display terminal to enable the display terminal to process the target task, includes the following:
  obtaining a first download address of an OTA upgrade packet included in the OTA upgrade task by parsing the OTA upgrade task, and downloading the OTA upgrade packet according to the first download address;
  performing verification on completeness and security of the OTA upgrade packet, and decoding the OTA upgrade packet when it is determined that the OTA upgrade packet is complete and secure;
  obtaining a compressed data packet by compressing the decoded OTA upgrade packet, and generating the OTA upgrade task packet according to the compressed data packet and the confirmation information for the heartbeat information; and sending the OTA upgrade task packet to the display terminal to enable the display terminal to update a program included in the display terminal according to the compressed data packet in the OTA upgrade task packet.

In some embodiments of the present disclosure, performing verification on completeness and security of the OTA upgrade packet includes the following:

performing verification on completeness of the OTA upgrade packet based on a preset information digest algorithm;

performing decryption on the OTA upgrade packet by using a first public key when it is determined that the OTA upgrade packet is a complete data packet; and determining that the OTA upgrade packet is a secure data packet when it is determined that a decryption result is successful decryption.

In some embodiments of the present disclosure, when the task to be processed is a base map update task, generating the target task according to the task to be processed and the confirmation information for the heartbeat information, and sending the target task to the display terminal to enable the display terminal to process the target task, includes the following:

obtaining a second download address of a base map to be updated by parsing the base map update task, and downloading the base map to be updated according to the second download address;

generating a target base map update task according to the base map to be updated as well as the task to be processed and the confirmation information for the heartbeat information; and sending the target base map update task to the display terminal to enable the display terminal to update a base map in the display terminal according to the base map to be updated included in the target base map update task.

In some embodiments of the present disclosure, the gateway for task processing further includes a feedback information receiving module and a task feedback linked list generation module.

The feedback information receiving module may be configured to receive task feedback information sent by the display terminal after completion of a conference reservation task and/or a display terminal registration task and/or an OTA upgrade task and/or a base map update task.

The task feedback linked list generation module may be configured to generate a task feedback linked list according to the task feedback information as well as a first task identification of the conference reservation task and/or a second task identification of the display terminal registration task and/or a third task identification of the OTA upgrade task and/or a fourth task identification of the base map update task.

In some embodiments of the present disclosure, receiving the task request sent by the client where the conference all-in-one machine is located, includes the following:

establishing an Http connection between the client where the conference all-in-one machine is located and the gateway, and receiving the task request sent by the client where the conference all-in-one machine is located based on the Http connection.

Among them, the task request is generated through performing a selection operation on task information displayed on a display interface of the client by a user.

The specific details of each module in the gateway for task processing have been described in detail in the corresponding method for task processing, and therefore, details are not described here again.

It should be noted that although several modules or units of a device for action execution are mentioned in the above detailed description, such partitioning is not mandatory. Actually, according to embodiments of the present disclosure, the features and functions of two or more modules or units described above may be embodied in one module or unit. Conversely, the features and functions of one module or unit described above may be further divided to be embodied in a plurality of modules or units.

Furthermore, although the various steps of the methods in the present disclosure are described in a particular order in the drawings, this does not require or imply that these steps must be performed in that particular order, or that all of the illustrated steps must be performed to achieve the desired results. Additionally or alternatively, some steps may be omitted, a plurality of steps may be combined into one step to be performed, and/or one step may be decomposed into a plurality of steps to be performed, etc.

According to some embodiments of the present disclosure, there is further provided an electronic device capable of implementing the above method.

Those skilled in the art can understand that various aspects of the present disclosure may be implemented as a system, a method, or a program product. Therefore, various aspects of the present disclosure may be specifically implemented in the following forms, that is: a complete hardware implementation, a complete software implementation (including firmware, microcode, etc.), or in an implementation by combining hardware and software, which may be collectively referred to as a "circuit", "a module" or "a system" here.

Figure 11:
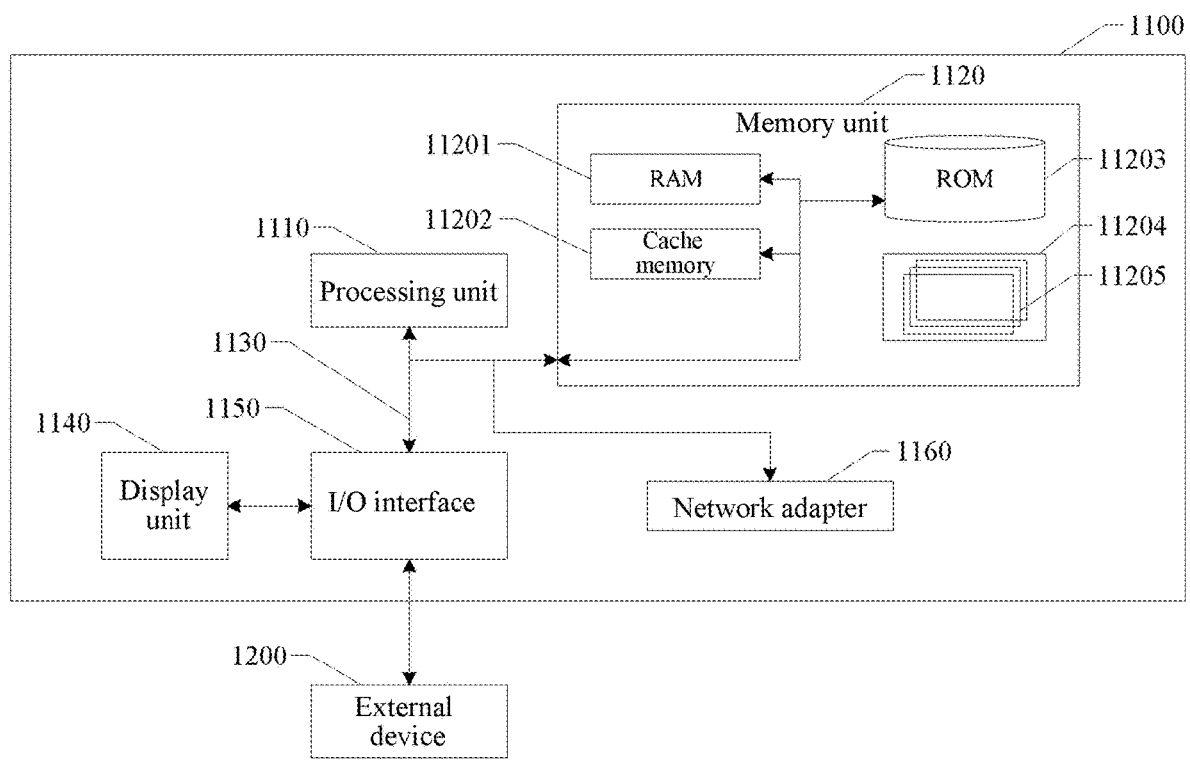
FIG. 11 schematically illustrates an electronic device for implementing the method for task processing according to some embodiments of the present disclosure.

Referring to FIG. 11, the electronic device 600 according to this embodiment of the present disclosure is described. The electronic device 600 shown in FIG. 11 is merely an example, and should not bring any limitation to the functions and use ranges of the embodiments of the present disclosure.

As shown in FIG. 11, the electronic device 1100 is represented in the form of a general-purpose computing device. The components of the electronic device 1100 may include, but are not limited to: at least one processing unit 1110, at least one memory unit 1120, a bus 1130 connecting different system components (including the memory unit 1120 and the processing unit 110), and the display unit 1140.

Among them, the memory unit stores a program code, and the program code may be executed by the processing unit 1110, so that the processing unit 1110 performs the steps according to various example embodiments of the present disclosure described in the above "exemplary method" part of the present description. For example, the processing unit 1110 may perform: the step S110 as shown in FIG. 1, receiving a task request sent by a client where a conference all-in-one machine is located, and obtaining a task to be processed included in the task request and a display terminal corresponding to the task to be processed by parsing the task request; step S120, determining whether the display terminal is present in a preset white list according to a terminal identification of the display terminal, and obtaining heartbeat information reported by the display terminal when it is determined that the display terminal is present in the white list; and step S130, generating a target task according to the task to be processed and confirmation information for the heartbeat information, and sending the target task to the display terminal to enable the display terminal to process the target task.

The memory unit 1120 may include a readable medium in the form of a volatile memory unit, such as a random access memory unit (RAM) 11201 and/or a cache memory unit 11202, and may further include a read-only memory unit (ROM) 11203.

The memory unit 1120 may also include a program/utility 11204 having a set of (at least one) program module 11205 including, but not limited to: an operating system, one or more applications, other program modules, and program data. Each of these examples or some combination of them may include an implementation of a network environment.

The bus 1130 may represent one or more of several types of bus structures, including a memory unit bus or a memory unit controller, a peripheral bus, a graphics acceleration port, a processing unit, or a local bus using any one of a plurality of bus structures.

The electronic device 1100 may also communicate with one or more external devices 1200 (e.g. a keyboard, a pointing device, a Bluetooth device, etc.), may also communicate with one or more devices that enable a user to interact with the electronic device 1100, and/or may communicate with any device (e.g. a router, a modem, etc.) that enables the electronic device 1100 to communicate with one or more other computing devices. Such communication may be performed through an input/output (I/O) interface 1150. Moreover, the electronic device 1100 may also communicate with one or more networks (e.g. a local area network (LAN), a wide area network (WAN), and/or a public network, such as the Internet) through the network adapter 1160. As shown in the drawing, the network adapter 1160 communicates with other modules of the electronic device 1100 through the bus 1130. It should be understood that although not shown in the drawing, other hardware and/or software modules may be used in conjunction with electronic device 1100, including but not limited to: microcode, device drivers, redundant processing units, external disk drive arrays, RAID systems, tape drives, and data backup storage systems, etc.

Through the description of the above embodiments, those skilled in the art would easily understand that the example embodiments described here may be implemented by software, or may be implemented by software in combination with necessary hardware. Therefore, the technical solution according to the embodiments of the present disclosure may be embodied in the form of a software product, and the software product may be stored in a non-volatile storage medium (which may be a CD-ROM, a USB flash disk, a mobile hard disk, etc.) or on a network. The software product may include several instructions to enable a computing device (which may be a personal computer, a server, a terminal apparatus, or a network device, etc.) to perform the method according to the embodiments of the present disclosure.

According to some embodiments of the present disclosure, there is further provided a computer-readable storage medium, and a program product capable of implementing the method described in the present description is stored on the computer-readable storage medium. In some possible implementations, various aspects of the present disclosure may also be implemented in the form of a program product, which includes a program code; and when the program product runs on a terminal device, the program code is used to enable the terminal device to perform the steps of the various example embodiments of the present disclosure described in the above "exemplary method" part of the present description.

According to an embodiment of the present disclosure, the program product for implementing the above method may employ a portable compact disk read-only memory (CD-ROM) and includes program code, and may run on a terminal device, such as a personal computer. However, the program product of the present disclosure is not limited to this. In the context, the readable storage medium may be any tangible medium containing or storing a program, and the program may be used by or combined with an instruction execution system, apparatus, or device.

The program product may employ any combination of one or more readable mediums. The readable medium may be a readable signal medium or a readable storage medium. The readable storage medium may be, for example, but not limited to, an electrical, magnetic, optical, electromagnetic, infrared, or semiconductor system, apparatus, or device, or any combination of them. More specific examples of the readable storage medium (non-exhaustive lists) include an electrical connection with one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of them.

The computer-readable signal medium may include a data signal that is propagated in a baseband or as part of a carrier, where the readable program code is carried. Such a propagated data signal may take a variety of forms, including, but not limited to, electromagnetic signals, optical signals, or any suitable combination of them. The readable signal medium may also be any readable medium other than the readable storage medium, and the readable medium may send, propagate, or transmit a program for use by or in connection with an instruction execution system, apparatus, or device.

The program code contained on the readable medium may be transmitted by any suitable medium, including but not limited to wireless medium, wired medium, optical cable, RF, etc., or any suitable combination of the above.

Program code for performing the operations of the present disclosure may be written in any combination of one or more programming languages, including object-oriented programming languages, such as Java, C++, etc., and also including conventional procedural programming languages, such as "C" language or similar programming languages. The program code may be executed entirely on the user computing device, partly on the user device, as a stand-alone software packet, partly on the user computing device and partly on a remote computing device, or entirely on the remote computing device or server. In situations involving a remote computing device, the remote computing device may be connected to a user computing device through any type of network, including a local area network (LAN) or a wide area network (WAN), or may be connected to an external computing device (e.g. via the Internet through an Internet Service Provider).

In addition, the above drawings are merely illustrative description of the processes included in the method according to example embodiments of the present disclosure, and are not intended to be limiting. It is easy to understand that the processes shown in the above drawings do not indicate or limit the temporal order of these processes. In addition, it is also easy to understand that these processes may be performed synchronously or asynchronously in a plurality of modules.

Other embodiments of the present disclosure will be apparent to those skilled in the art from consideration of the description and practice of the present disclosure. The present disclosure is intended to cover any variations, uses, or adaptations of the present disclosure following the general principles of the present disclosure and including common general knowledge or conventional technical means in the art not disclosed here. The description and embodiments are considered as examples only, with a true scope and spirit of the present disclosure being indicated by the claims.

What is claimed is:

1. A method for task processing, configured on performed by a gateway, and comprising:
   receiving a task request sent by a client where a conference all-in-one machine is located, and obtaining a task to be processed comprised in the task request and a display terminal corresponding to the task to be processed by parsing the task request;
   determining whether the display terminal is present in a preset white list according to a terminal identification of the display terminal, and obtaining heartbeat information reported by the display terminal in response to determining that the display terminal is present in the white list; and
   generating a target task according to the task to be processed and confirmation information for the heartbeat information, and sending the target task to the display terminal to enable the display terminal to process the target task.

2. The method for task processing according to claim 1, further comprising:
   establishing a task folder corresponding to the display terminal according to the terminal identification, and determining a task start time and a task end time of the task folder according to the task to be processed;
   wherein, determining whether the display terminal is present in the preset white list according to the terminal identification of the display terminal, comprises:
   calculating a first time difference and/or a second time difference between a current time node and the task start time and/or the task end time, and determining whether the first time difference and/or the second time difference satisfies a preset condition; and
   determining, in response to determining that the first time difference and/or the second time difference satisfies the preset condition, whether the display terminal is present in the preset white list according to the terminal identification.

3. The method for task processing according to claim 2, wherein determining whether the first time difference and/or the second time satisfies the preset condition comprises:
   determining whether the first time difference and/or the second time difference is greater than a first preset threshold, wherein the first preset threshold is zero.

4. The method for task processing according to claim 2, wherein determining whether the display terminal is present in the preset white list according to the terminal identification, further comprises:
   calculating a difference between a reporting terminal identification reported by the display terminal and the terminal identification; and
   determining, in response to determining that the difference is greater than the first preset threshold, whether the display terminal is present in the preset white list according to the terminal identification.

5. The method for task processing according to claim 1, wherein the task to be processed comprises one or more of a conference reservation task, a display terminal registration task, an Over-The-Air (OTA) upgrade task, and a base map update task.

6. The method for task processing according to claim 5, wherein the task to be processed is a conference reservation task, and generating the target task according to the task to be processed and the confirmation information for the heartbeat information, and sending the target task to the display terminal to enable the display terminal to process the target task, comprises:
   generating a conference time display task according to the confirmation information for the heartbeat information as well as a conference start time and a conference end time comprised in the conference reservation task; and
   sending the conference time display task to the display terminal to enable the display terminal to display the conference start time and the conference end time.

7. The method for task processing according to claim 5, wherein the task to be processed is a display terminal registration task, and the method for task processing further comprises:
   adding a terminal identification of the display terminal comprised in the display terminal registration task to the white list, and receiving a registration request sent by the display terminal;
   wherein generating the target task according to the task to be processed and the confirmation information for the heartbeat information, and sending the target task to the display terminal to enable the display terminal to process the target task, comprises:
   calculating a terminal key of the display terminal according to a plaintext general key comprised in the registration request, and generating a confirmation registration task according to the terminal key and the confirmation information for the heartbeat information; and
   sending the confirmation registration task to the display terminal to complete registration of the display terminal on a side of the gateway.

8. The method for task processing according to claim 7, wherein calculating the terminal key of the display terminal according to the plaintext general key comprised in the registration request comprises:
   obtaining the plaintext general key comprised in the registration request, and determining whether the plaintext general key is a legal key; and
   taking, in response to determining that the plaintext general key is a legal key, the plaintext general key as an encryption factor, and performing calculation on the plaintext general key by using a preset encryption algorithm to obtain the terminal key of the display terminal.

9. The method for task processing according to claim 5, wherein the task to be processed is an OTA upgrade task, and generating the target task according to the task to be processed and the confirmation information for the heartbeat information, and sending the target task to the display terminal to enable the display terminal to process the target task, comprises:
   obtaining a first download address of an OTA upgrade packet comprised in the OTA upgrade task by parsing the OTA upgrade task, and downloading the OTA upgrade packet according to the first download address;

performing verification on completeness and security of the OTA upgrade packet, and decoding the OTA upgrade packet in response to determining that the OTA upgrade packet is complete and secure;

obtaining a compressed data packet by compressing the decoded OTA upgrade packet, and generating an OTA upgrade task packet according to the compressed data packet and the confirmation information for the heartbeat information; and sending the OTA upgrade task packet to the display terminal to enable the display terminal to update a program comprised in the display terminal according to the compressed data packet in the OTA upgrade task packet.

10. The method for task processing according to claim 9, wherein performing verification on completeness and security of the OTA upgrade packet comprises:

performing verification on completeness of the OTA upgrade packet based on a preset information digest algorithm;

performing decryption on the OTA upgrade packet by using a first public key in response to determining that the OTA upgrade packet is a complete data packet; and determining that the OTA upgrade packet is a secure data packet in response to determining that a decryption result is successful decryption.

11. The method for task processing according to claim 5, wherein the task to be processed is a base map update task, generating the target task according to the task to be processed and the confirmation information for the heartbeat information, and sending the target task to the display terminal to enable the display terminal to process the target task, comprises:

obtaining a second download address of a base map to be updated by parsing the base map update task, and downloading the base map to be updated according to the second download address;

generating a target base map update task according to the base map to be updated as well as the task to be processed and the confirmation information for the heartbeat information; and sending the target base map update task to the display terminal to enable the display terminal to update a base map in the display terminal according to the base map to be updated comprised in the target base map update task.

12. The method for task processing according to claim 5, further comprising:

receiving task feedback information sent by the display terminal after completion of at least one of a conference reservation task, a display terminal registration task, an OTA upgrade task, or a base map update task; and generating a task feedback linked list according to the task feedback information as well as at least one of a first task identification of the conference reservation task, a second task identification of the display terminal registration task, a third task identification of the OTA upgrade task, or a fourth task identification of the base map update task.

13. The method for task processing according to claim 1, wherein receiving the task request sent by the client where the conference all-in-one machine is located comprises:

establishing an Http connection between the client where the conference all-in-one machine is located and the gateway, and receiving the task request sent by the client where the conference all-in-one machine is located based on the Http connection;

wherein the task request is generated through performing a selection operation on task information displayed on a display interface of the client by a user.

14. A non-transitory computer-readable storage medium, with a computer program stored thereon, wherein when the computer program is executed by a processor, a method for task processing is implemented, and the method for task processing comprises:

receiving a task request sent by a client where a conference all-in-one machine is located, and obtaining a task to be processed comprised in the task request and a display terminal corresponding to the task to be processed by parsing the task request;

determining whether the display terminal is present in a preset white list according to a terminal identification of the display terminal, and obtaining heartbeat information reported by the display terminal in response to determining that the display terminal is present in the white list; and generating a target task according to the task to be processed and confirmation information for the heartbeat information, and sending the target task to the display terminal to enable the display terminal to process the target task.

15. An electronic device, comprising:

a processor; and a memory, configured to store an executable instruction of the processor, wherein the processor is configured to perform a method for task processing by executing the executable instruction, and the method for task processing comprises:

receiving a task request sent by a client where a conference all-in-one machine is located, and obtaining a task to be processed comprised in the task request and a display terminal corresponding to the task to be processed by parsing the task request;

determining whether the display terminal is present in a preset white list according to a terminal identification of the display terminal, and obtaining heartbeat information reported by the display terminal in response to determining that the display terminal is present in the white list; and generating a target task according to the task to be processed and confirmation information for the heartbeat information, and sending the target task to the display terminal to enable the display terminal to process the target task.

16. The electronic device according to claim 15, wherein the method for task processing further comprises:

establishing a task folder corresponding to the display terminal according to the terminal identification, and determining a task start time and a task end time of the task folder according to the task to be processed;

wherein, determining whether the display terminal is present in the preset white list according to the terminal identification of the display terminal, comprises:

calculating a first time difference and/or a second time difference between a current time node and the task start time and/or the task end time, and determining whether the first time difference and/or the second time difference satisfies a preset condition; and determining, in response to determining that the first time difference and/or the second time difference satisfies the preset condition, whether the display terminal is present in the preset white list according to the terminal identification.

17. The electronic device according to claim 16, wherein determining whether the first time difference and/or the second time satisfies the preset condition comprises:

determining whether the first time difference and/or the second time difference is greater than a first preset threshold, wherein the first preset threshold is zero.

18. The electronic device according to claim 16, wherein determining whether the display terminal is present in the preset white list according to the terminal identification, further comprises:

calculating a difference between a reporting terminal identification reported by the display terminal and the terminal identification; and determining, in response to determining that the difference is greater than the first preset threshold, whether the display terminal is present in the preset white list according to the terminal identification.

19. The electronic device according to claim 16, wherein calculating the terminal key of the display terminal according to the plaintext general key comprised in the registration request comprises:

obtaining the plaintext general key comprised in the registration request, and determining whether the plaintext general key is a legal key; and taking, in response to determining that the plaintext general key is a legal key, the plaintext general key as an encryption factor, and performing calculation on the plaintext general key by using a preset encryption algorithm to obtain the terminal key of the display terminal.

20. The electronic device according to claim 15, wherein the method for task processing further comprises:

receiving task feedback information sent by the display terminal after completion of at least one of a conference reservation task, a display terminal registration task, an OTA upgrade task, or a base map update task; and generating a task feedback linked list according to the task feedback information as well as at least one of a first task identification of the conference reservation task, a second task identification of the display terminal registration task, a third task identification of the OTA upgrade task, or a fourth task identification of the base map update task.

\* \* \* \* \*